(12) United States Patent
Jiang

(10) Patent No.: US 10,259,979 B2
(45) Date of Patent: Apr. 16, 2019

(54) SEALANT COMPOSITION AND METHOD FOR CURING THE SAME, DISPLAY DEVICE AND SEALING METHOD, AND USE THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Kun Jiang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 101 days.

(21) Appl. No.: 15/157,924

(22) Filed: May 18, 2016

(65) Prior Publication Data

US 2017/0029674 A1 Feb. 2, 2017

(30) Foreign Application Priority Data

Jul. 30, 2015 (CN) .......................... 2015 1 0459181

(51) Int. Cl.
   *C09J 163/00* (2006.01)
   *G02F 1/1341* (2006.01)
   *C09J 163/10* (2006.01)
   *C08G 59/18* (2006.01)

(52) U.S. Cl.
   CPC .......... *C09J 163/00* (2013.01); *C08G 59/188* (2013.01); *C09J 163/10* (2013.01); *G02F 1/1341* (2013.01); *G02F 2202/023* (2013.01); *G02F 2202/28* (2013.01)

(58) Field of Classification Search
   CPC .............................. C09J 163/00; C09J 163/10
   See application file for complete search history.

(56) References Cited

U.S. PATENT DOCUMENTS

| 3,391,095 A * | 7/1968 | Tringali | C08G 59/188 523/211 |
| 3,395,105 A * | 7/1968 | Washburn | C08G 59/188 156/330 |
| 9,771,449 B2 * | 9/2017 | Khoee | C08G 59/188 |
| 2007/0208106 A1 * | 9/2007 | Chen | C08G 59/18 523/137 |

FOREIGN PATENT DOCUMENTS

| CN | 102236213 A | 11/2011 | |
| CN | 103831064 A | 6/2014 | |
| CN | 103897645 A | 7/2014 | |
| JP | H06-145606 A | 5/1994 | |
| JP | 2010013507 A * | 1/2010 | ......... C08G 59/1461 |

OTHER PUBLICATIONS

Machine translation of CN 103897645 A, dated Jul. 2, 2014.*
Machine translation of JP 06-145606 A, dated May 27, 1994.*
Machine translation of JP 2010-013507 A, published Jan. 21, 2010. (Year: 2010).*
First Office Action regarding Chinese Application No. 201510459181.9, dated Feb. 3, 2017.

* cited by examiner

*Primary Examiner* — Vickey Nerangis
(74) *Attorney, Agent, or Firm* — Harness, Dickey & Pierce, P.L.C.

(57) ABSTRACT

Disclosed is a sealant composition. The sealant composition is composed of an epoxy resin having an active group, α-cyanoacrylate, an initiator wrapped with an inert sheathing material, a thermal curing agent, a filler, a coupling agent and an epoxy resin having no active groups. In the invention, a method for initiating sealant curing via a chemical initiator is employed, thus the UV irradiation process may be avoided, the cell alignment process may be simplified, and the cost of UV process and UV Mask, etc., may be saved; additionally, the sealant cure effect is uniform and controllable, and the risk of sealant break and liquid crystal pollution may be avoided.

13 Claims, 2 Drawing Sheets

SEALANT COMPOSITION AND METHOD FOR CURING THE SAME, DISPLAY DEVICE AND SEALING METHOD, AND USE THEREOF

CROSS-REFERENCE TO RELATED APPLICATION

The present application claims priority to and incorporates by reference the entire contents of Chinese priority document 201510459181.9, filed in China on Jul. 30, 2015.

TECHNICAL FIELD

The present invention relates to the field of sealants, specifically, to a sealant composition and a method for curing the same, a display device and a sealing method and use thereof, and in particular, to sealant composition that is initiated to cure via a chemical initiator, and use thereof.

BACKGROUND

In the field of liquid crystal displays, narrow bezel is a target of liquid crystal display. With the unceasing development of the small-scale panel industry, stricter and stricter requirements are laid on the narrow bezel of mobile phone products, various mobile phones with narrow bezels emerge in endlessly, and there even appears a design concept of no bezel. This is a great challenge to the panel manufacture industry. At present, the bezel design of TFT-LCD becomes narrower and narrower, for example, from the general 1.3 mm bezel to 1.0 mm bezel, or there even appears a 0.9 mm and 0.8 mm bezel design. As the bezel is narrowed, the peripheral wiring on the TFT side becomes denser and denser, and the transmittance becomes lower and lower, which is an important factor that currently restricts the narrow bezel of a liquid crystal display.

At present, the method for sealing a liquid crystal bezel employs the process as shown in FIG. 1, wherein, because the curing initiator in the sealant is a photoinitiator, a UV-irradiated curing process is indispensable, which is a severe tribulation to the UV curing effect of the sealant. As the UV irradiation effect is lowered, the sealant cure effect becomes poor, which causes the liquid crystal to intrude into the sealant and thus causes LC pollution. Finally, a problem of image retention will be caused due to sealant break, liquid crystal leakage or increase of liquid crystal impurity.

Therefore, it has become a hot spot in the research of small-scale TFT-LCD how to improve the sealant curing effect on the basis of narrow bezel design.

SUMMARY

It is an object of the present invention to provide a sealant composition, which contains no photoinitiators, wherein, the initiator is wrapped with an inert sheathing, so that the initiator may be released under the pressure during a cell alignment process to rapidly initiate a curing reaction. During the curing process of the sealant composition, no UV irradiation process is required, which is especially applicable for the sealant composition for a small-scale narrow bezel LCD and use thereof.

Therefore, one embodiment of the invention provides a sealant composition, which includes an epoxy resin and an initiator wrapped with an inert sheathing material. Optionally, the initiator wrapped with an inert sheathing is a microsphere obtained by wrapping an initiator with a brittle resin. For example, the initiator wrapped with an inert sheathing is an initiator microsphere particle formed by taking an initiator as a core material and a brittle resin material as the sheathing via self-organization, in situ polymerization, co-mixing deposition, solvent-thermal or hydrothermal method; wherein, the brittle resin is one selected from polystyrene, acrylic resin, phenolic resin, polyester resin; optionally, the initiator is an anionic initiator; optionally, the anionic initiator is one of a series of low active anionic initiators such as pyridine, $NR_3$ (wherein R may be an alkyl, for example, ethyl), a weak base, ROR (wherein R may be an alkyl, for example, propyl) and $H_2O$, etc.

A content of the initiator wrapped with an inert sheathing material may be set reasonably as required; specifically, it may be 0.1-10% of the total weight of the sealant composition, and optionally, 0.5-5%, or optionally, 0.5-1%.

The substrate of a liquid crystal display device is sealed by the sealant composition of the invention, wherein, the initiator is released by the pressure during the cell alignment process, and it is heated at 110-130° C. for 1-2 h to complete the chemical curing of the sealant composition. During the chemical curing process, the curing effect of the sealant is mainly influenced by the content of the initiator, thus the curing effect of the sealant may be adjusted and controlled by controlling the doping amount of the initiator, thereby an optimum curing effect may be attained, and the risk of sealant break, puncturation and liquid crystal pollution may be avoided. UV irradiation is adverse to the stability of liquid crystal, and it tends to generate impurity ions and cause a problem of image retention. In the invention, the use of UV is avoided, thus the generation of image retention may be reduced. However, if a traditional doping method is employed, it tends to cause the problems that the sealant is unstable and the curing speed is slow. Therefore, the invention a novel doping and initiating method.

In one embodiment of the invention, a diameter of the initiator microsphere particle is 4-10 μm, for example, 5-10 μm.

In another embodiment of the invention, the sealant composition further includes α-cyanoacrylate.

The structural formula of α-cyanoacrylate is as follows:

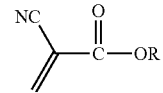

wherein, R is chain alkane or arene. For example, R may be C1-18 chain alkane.

The epoxy resin is composed of an epoxy resin having an active group and an epoxy resin having no active groups.

Optionally, the structural formula of the epoxy resin having an active group is as follows:

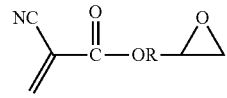

wherein, R is chain alkane or arene. For example, R may be C1-18 chain alkane.

Optionally, the epoxy resin having no active groups is an epoxy resin having neither a highly active carbon-carbon double bond nor a highly active carbon-carbon triple bond that can be initiated to polymerize by a weak base, with a skeleton symbol of

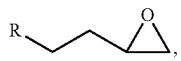

wherein, R is chain alkane or arene, for example, R may be C1-18 chain alkane.

In one embodiment of the invention, the sealant composition according to the invention is composed of an epoxy resin having an active group, α-cyanoacrylate, an initiator wrapped with an inert sheathing material, a thermal curing agent, a filler, a coupling agent and an epoxy resin having no active groups.

Optionally, the coupling agent is one selected from aminosilane coupling agent, vinylsilane coupling agent and epoxysilane coupling agent.

Optionally, the filler is at least one selected from silicon dioxide microsphere and elastomer microsphere.

In one embodiment of the invention, the sealant composition is composed of constituents with the following mass percentages:

| | |
|---|---|
| the epoxy resin having an active group | 20~30%; |
| the α-cyanoacrylate | 10~20%; |
| the initiator wrapped with an inert sheathing material | 0.5-1%; |
| the thermal curing agent | 5-10%; |
| the filler | 15-20%; |
| the coupling agent | 2-5%; and |
| the epoxy resin having no active groups | 20~30%. |

Optionally, in one embodiment of the invention the active group is a polymerizable group.

It is another object of the invention to provide a display device, which uses the above sealant composition as a peripheral sealant of the substrate.

Use of the sealant composition in the sealing of a display device also falls into the protection scope of the invention, wherein, the display device is an OLED display panel or an LCD display panel. Optionally, the display device is a TFT-LCD display panel.

The novel points and technical effects of the invention are as follows:

In the invention, a method for initiating sealant curing via a chemical initiator is employed, the curing is initiated by an initiator wrapped with microspheres, and the curing process is started by the cell alignment pressure, thus the UV irradiation process may be avoided, the cell alignment process may be simplified, the cost of UV process and UV Mask, etc., may be saved, and a series of problems caused by the use of UV may be avoided. Additionally, the sealant cure effect is uniform and controllable, and the risk of sealant break and liquid crystal pollution may be avoided.

The invention further has the advantage that the sealant curing effect in narrow bezel design is improved. For example, for the current small-scale TFT-LCD display screen, as the bezel becomes narrower increasingly, the peripheral wiring becomes denser and denser, which causes the light transmittance on the TFT side to be lower and lower after the UV curing of the sealant, so that the UV curing effect will be insufficient, and at the same time, the wiring arrangement will be influenced. For the sealant composition of the invention, rapid chemical curing of the sealant is initiated by the releasing of the initiator during the cell alignment process. By this method, the use of UV light may be avoided, the process flow of the cell alignment process may be simplified, the process cost may be lowered, the restriction on TFT wiring by the UV transmittance may be avoided (at present, it requires that the UV transmittance should be greater than 30%), the sealant curing efficiency may be improved, and the wiring space for the TFT peripheral wiring may be increased.

BRIEF DESCRIPTION

DETAILED DESCRIPTION

Figure 1:
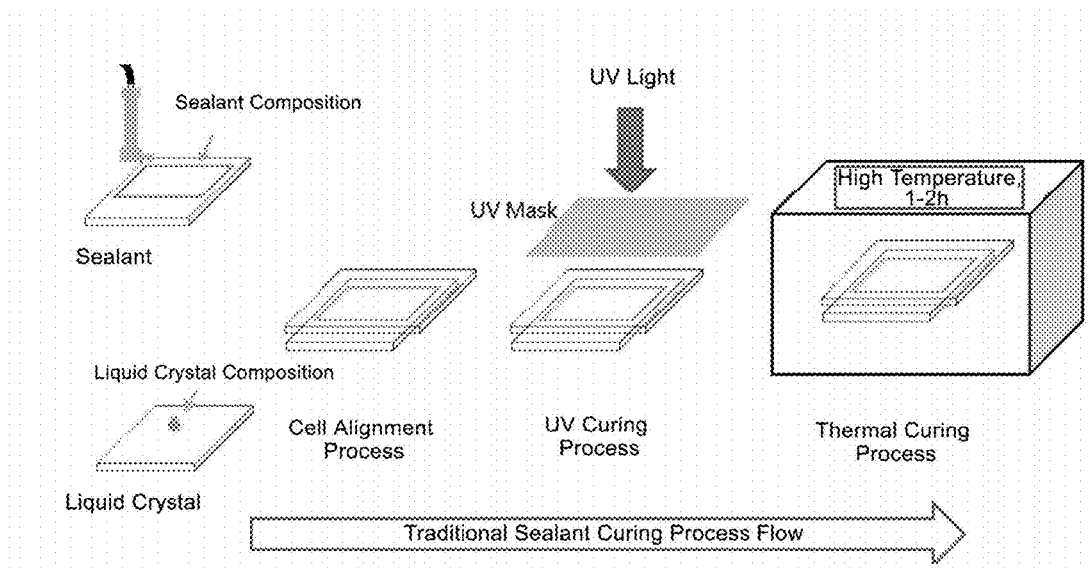
FIG. 1 shows an packaging and curing process flow (UV curing) of a sealant in a traditional process.

One embodiment of the invention provides a sealant composition, which includes an epoxy resin and an initiator wrapped with an inert sheathing material.

Optionally, the initiator wrapped with an inert sheathing is a microsphere obtained by wrapping an initiator with a brittle resin.

For example, the initiator wrapped with an inert sheathing is an initiator microsphere particle formed by taking an initiator as the core material and a brittle resin material as the sheathing via self-organization, in situ polymerization, co-mixing deposition, solvent-thermal or hydrothermal method; wherein, the brittle resin is one selected from polystyrene, acrylic resin, phenolic resin, polyester resin; optionally, the initiator is an anionic initiator; optionally, the anionic initiator is one of a series of low active anionic initiators, for example, pyridine, $NR_3$ (wherein R may be an alkyl, for example, ethyl), a weak base, ROR (wherein R may be an alkyl, for example, ethyl) and $H_2O$, etc.

A content of the initiator wrapped with an inert sheathing may be set reasonably as required; specifically, it may be 0.1-10% of the total weight of the sealant composition, and optionally, 0.5-5%, and more optionally, 0.5-1%. In one embodiment of the invention, the diameter of the initiator microsphere particle is 4-10 μm, for example, 5-10 μm.

In another embodiment of the invention, the sealant composition further includes α-cyanoacrylate.

The structural formula of α-cyanoacrylate is as follows:

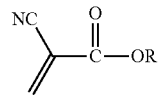

Wherein, R is chain alkane or arene. For example, R may be C1-18 chain alkane.

The epoxy resin is composed of an epoxy resin having an active group and an epoxy resin having no active groups.

Optionally, for the epoxy resin having an active group, and the active group may be α-cyanoacrylate group, the molecular weight of the epoxy resin is 500-1000, specifically, the structural formula of the epoxy resin having an active group may be:

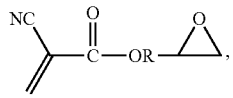

wherein, R is chain alkane or arene. For example, R may be C1-18 chain alkane.

Optionally, the epoxy resin having no active groups is an epoxy resin having neither a highly active carbon-carbon double bond nor a highly active carbon-carbon triple bond that can be initiated to polymerize by a weak base, with a skeleton symbol of

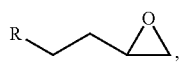

wherein, R is chain alkane or arene, for example, R may be C1-18 chain alkane.

In one embodiment of the invention, the sealant composition is composed of an epoxy resin having an active group, α-cyanoacrylate, an initiator wrapped with an inert sheathing material, a thermal curing agent, a filler, a coupling agent and an epoxy resin having no active groups.

In one embodiment of the invention, the epoxy resin having no active groups carries neither a highly active carbon-carbon double bond nor a highly active carbon-carbon triple bond that can be initiated to polymerize by a weak base, with a skeleton symbol of

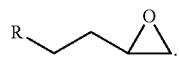

In one embodiment of the invention, the initiator wrapped with an inert sheathing is a microsphere obtained by wrapping an initiator with a brittle resin.

For example, the initiator wrapped with an inert sheathing is an initiator microsphere particle formed by taking an initiator as the core material and a brittle resin material as the sheathing via self-organization, in situ polymerization, co-mixing deposition, solvent-thermal or hydrothermal method; wherein, the brittle resin is one selected from polystyrene, acrylic resin, phenolic resin, polyester resin; optionally, the initiator is an anionic initiator; for example, the anionic initiator is one of a series of low active anionic initiators such as pyridine, $NR_3$, weak base, ROR and $H_2O$, etc.

Figure 3:
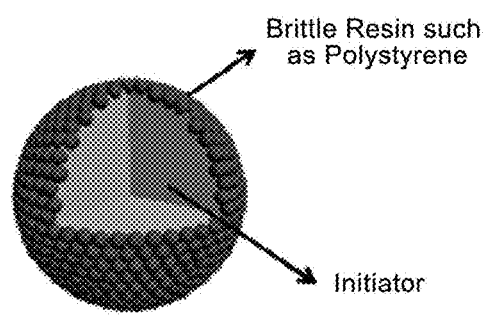
FIG. 3 shows the structure of an initiator microsphere formed by wrapping the initiator with an inert sheathing in the sealant according to the invention.

In another embodiment of the invention, the diameter of the initiator microsphere particle is 4-10 μm, for example, 5-10 μm. The structure of the initiator microsphere particle is as shown in FIG. 3.

Figure 4:
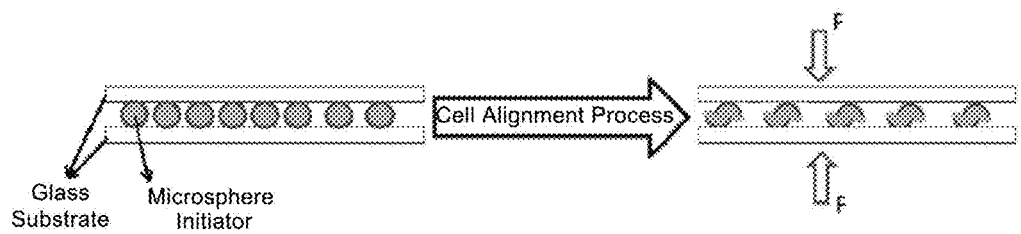
FIG. 4 shows an initiator releasing process (during a cell alignment process, the sheathing of the initiator microsphere is broken under the action of an external force, and the initiator is released to initiate sealant polymerization).

The initiator microsphere is doped in the sealant, and due to the protection of the resin, the initiator cannot initiate the sealant to cure; during the cell alignment process, the brittle resin is crushed under the action of the cell alignment pressure, and the initiator is released to the sealant system (as shown in FIG. 4), and hence the reaction shown in 1-1 below is initiated to make the sealant cure rapidly.

In yet another embodiment of the invention, the structural formula of α-cyanoacrylate is as follows:

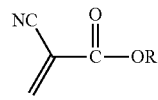

wherein, R is chain alkane or arene;

Optionally, the coupling agent is one selected from aminosilane coupling agent, vinylsilane coupling agent and epoxysilane coupling agent.

Optionally, the filler is at least one selected from silicon dioxide microsphere and elastomer microsphere.

In one embodiment of the invention, the sealant composition is composed of constituents with the following mass percentages:

| | |
|---|---|
| the epoxy resin having an active group | 20~30%; |
| the α-cyanoacrylate | 10~20%; |
| the initiator wrapped with an inert sheathing material | 0.5-1%; |
| the thermal curing agent | 5-10%; |
| the filler | 15-20%; |
| the coupling agent | 2-5%; and |
| the epoxy resin having no active groups | 20~30%. |

The sealant composition is composed of an epoxy resin having an active group (for example, having an active α-cyanoacrylate group, with a molecular weight of 500-1000), α-cyanoacrylate (which is cured rapidly under the action of an initiator), an initiator wrapped with an inert sheathing (a microsphere with a diameter of 4-10 μm, which is released during a cell alignment process to initiate polymerization), a thermal curing agent (a polyamine-type curing agent) and a filler, a coupling agent, and an epoxy resin having no active groups.

The specific principle by which the sealant composition of the invention is applied to the peripheral sealant of the substrate of a liquid crystal display device is as follows.

Figure 2:
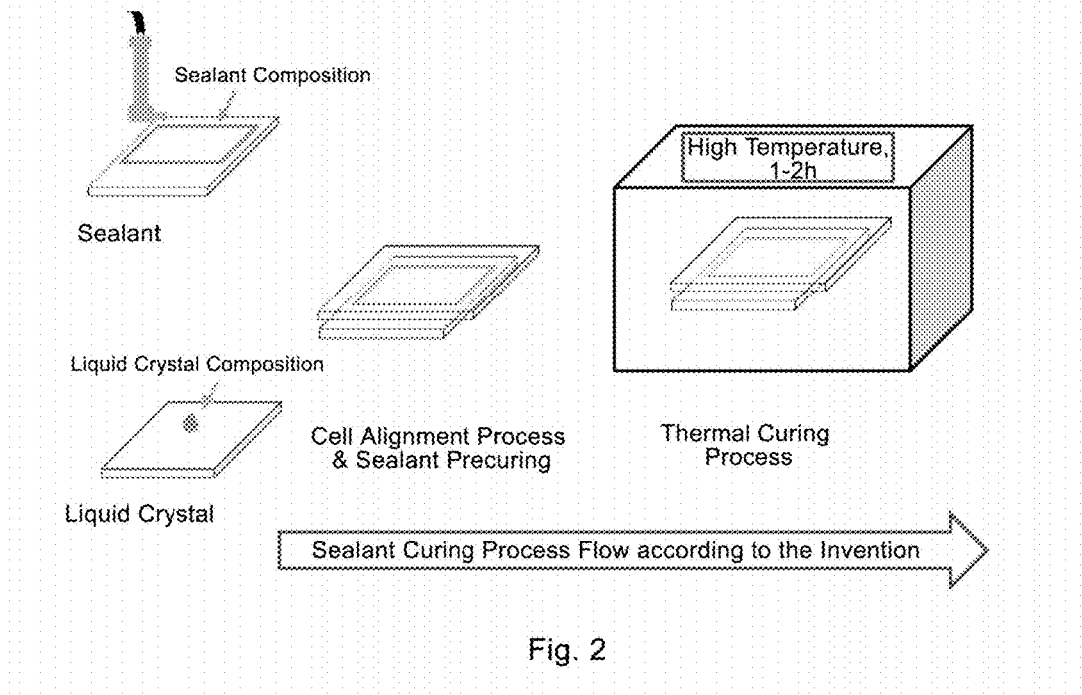
FIG. 2 shows an packaging and curing process flow (chemical curing) of a sealant according to one embodiment of the invention.

The process flow of a curing process that employs the above sealant is as shown in FIG. 2, which is used for replacing the UV curing process currently employed. Specifically, it includes the steps of: coating a sealant on a position that is set; oppositely arranging it with the liquid crystals to form a cell, and completing precuring at this time; and heating (at 110-130° C.) to complete sealing.

The curing mechanism of the sealant is as follows:

the epoxy resin having an active group:

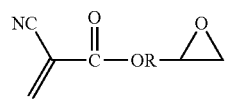

the α-cyanoacrylate:

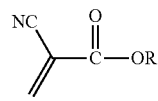

the thermal curing agent (polyamine-type): a polyamine-type thermal curing agent, for example, an aromatic polyamine-type, aliphatic diamine.

Curing Process 1-1) Preliminary curing under the action of an anionic initiator:

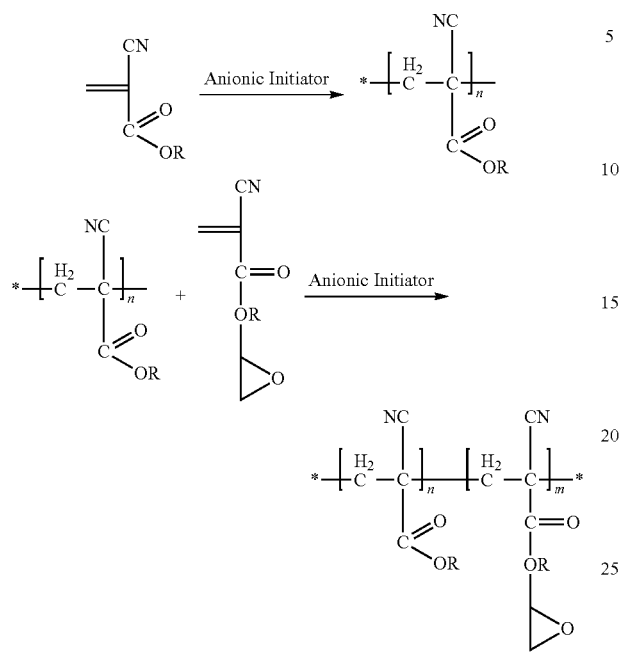

1-2) Thermal curing under the action of a thermal cross-linking agent

The reaction speed of reaction 1-1 is fast, and the use of UV light irradiation is avoided; however, the reaction time is short, the polymer cures incompletely, and the molecular weight is low.

Under the action of high temperature, the epoxy groups in the resin further crosslink with the polyamine, the molecular weight increases, and the strength is enhanced, and finally the object of sealing is ottained.

Reaction Process

Mechanism of Single Reaction

The speed of this reaction is very fast, and it is usually completed in 1 min. At this time, preliminary curing of the sealant is completed, the molecular weight of the sealant increases to 5000~10000, and it has a certain strength and hardness, thus sealant puncturation and liquid crystal pollution may be effectively avoided.

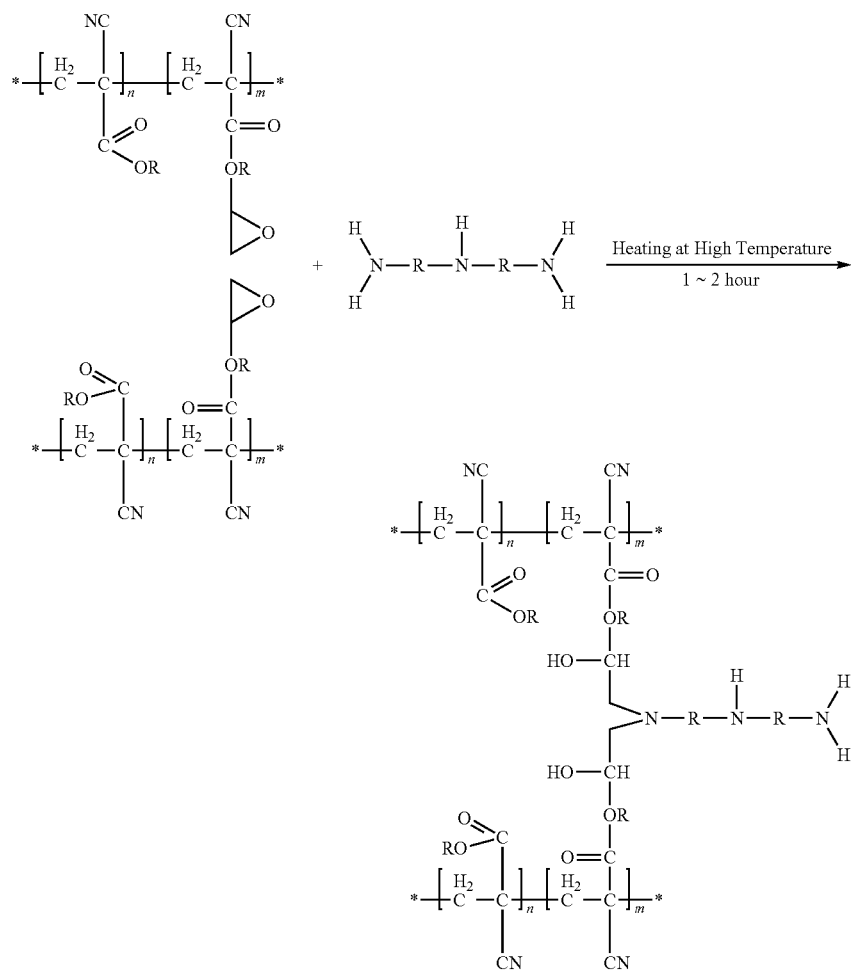

Overall Crosslinking and Curing Mechanism

Coupling agent: aminosilane coupling agent.

With the progress of the thermal curing reaction, the whole macromolecules are crosslinked to form a large crosslinking network, the molecular weight increases rapidly, the strength is enhanced, and the curing process of the sealant is completed.

In the invention, a novel sealant system is employed, wherein an initiator wrapped with an inert sheathing is doped, and during a cell alignment process, the inert sheathing is broken under the action of an external force, and the initiator is released to initiate sealant prepolymerization. This method may be used to replace the UV curing process currently employed, and the cell alignment process may be simplified.

EMBODIMENTS

Embodiment 1

In this embodiment, the sealant composition is composed of constituents with the following mass percentages:

| | |
|---|---|
| epoxy resin having an active group | 30%; |
| α-cyanoacrylate | 15%; |
| initiator wrapped with an inert sheathing material | 0.7%; |
| thermal curing agent | 10%; |
| filler | 15%; |
| coupling agent | 5%; and |
| epoxy resin having no active groups | 24.3%. |

The structural formula of the above epoxy resin having an active group is as follows:

wherein, R is propyl.

α-cyanoacrylate: methyl α-cyanoacrylate.

Thermal curing agent: aliphatic polyamine (ethylene diamine).

Filler: silicon dioxide microsphere.

Initiator wrapped with an inert sheathing material: the initiator is tributylamine, the sheathing is polystyrene, the synthetic method is in situ polymerization, and the wrapping method is specifically as follows:

1) Blending BPO (a free radical initiator) in tributylamine;

2) Forming tributylamine particles of 0.5~3 μm via physical vibration separation;

3) Dispersing the particles in styrene, initiating styrene polymerization via free radical polymerization, and forming a polystyrene sheathing on the surface of tributylamine Epoxy resin having no active groups:

a skeleton symbol is wherein R is hexyl.

The above raw materials are mixed according to certain mass percentages, and thus a sealant is prepared.

Liquid crystals are sealed by the above sealant, and the specific steps are as shown in FIG. 2, which includes: coating a sealant on a position that is set; oppositely arranging it with the liquid crystals to form a cell, and completing precuring at this time; and placing the sealant at 120° C. for thermal curing.

Tests indicate that, the sealant has a good curing performance, the curing speed of the liquid crystal screen is fast (the curing temperature is 120° C., and the cure time is 70 minutes), the sealant has a good antipollution effect, and the liquid crystal screen exhibits an excellent image retention effect.

Curing is complete, and the cured product exhibits no sealant break and liquid leakage phenomena after being boiled with water for 4 hours, and no sealant break and liquid leakage phenomena after being frozen at −400° C. for 4 hours.

Reactivity with liquid crystals: samples of sealants to be tested are trial-produced according to production process conditions, and the photoelectric properties thereof are tested. The sealants do not extend toward the direction of the visible area. The photoelectric parameters of the liquid crystals are not influenced, and the change of the photoelectric properties after the high-temperature and high-humidity reliability test meets the requirements of the product.

Embodiment 2

In this embodiment, the sealant composition is composed of constituents with the following mass percentages:

| | |
|---|---|
| epoxy resin having an active group | 25%; |
| α-cyanoacrylate | 20%; |
| initiator wrapped with an inert sheathing material | 0.75%; |
| thermal curing agent | 10%; |
| filler | 15%; |
| coupling agent | 5%; and |
| epoxy resin having no active groups | 24.25%. |

The structural formula of the above epoxy resin having an active group is as follows:

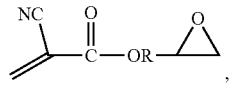

wherein, R is butyl.

α-cyanoacrylate: methyl α-cyanoacrylate.

Thermal curing agent: aliphatic polyamine (hexanediamine).

Filler: elastomer microsphere.

Coupling agent: aminosilane coupling agent.

Initiator wrapped with an inert sheathing material: the initiator is tributylamine, the sheathing is polystyrene, the synthetic method is in situ polymerization, and the wrapping method is specifically as follows:

1) Blending BPO (a free radical initiator) in tributylamine;
2) Forming tributylamine particles of 0.5~3 μm via physical vibration separation;
3) Dispersing the particles in styrene, initiating styrene polymerization via free radical polymerization, and forming a polystyrene sheathing on the surface of tributylamine.

Epoxy resin having no active groups:

a skeleton symbol is

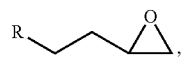

wherein, R is butyl.

The above raw materials are mixed according to certain mass percentages, and thus a sealant is prepared.

Liquid crystals are sealed by the above sealant, and the specific steps are as shown in FIG. 2, which includes: coating a sealant on a position that is set; oppositely arranging it with the liquid crystals to form a cell, and completing precuring at this time; then, the sealant is placed at 110° C. for thermal curing.

Tests indicate that, the sealant has a good curing performance, the curing speed of the liquid crystal screen is fast (the curing temperature is 110° C., and the cure time is 75 minutes), the sealant has a good antipollution effect, and the liquid crystal screen exhibits an excellent image retention effect.

Curing is complete, the cured product exhibits no sealant break and liquid leakage phenomena after being boiled with water for 4 hours, and no sealant break and liquid leakage phenomena after being frozen at −400° C. for 4 hours.

Reactivity with liquid crystals: samples of sealants to be tested are trial-produced according to production process conditions, and the photoelectric properties thereof are tested. The sealants do not extend toward the direction of the visible area. The photoelectric parameters of the liquid crystals are not influenced, and the change of the photoelectric properties after the high-temperature and high-humidity reliability test meets the requirements of the product.

The above description only shows some optional embodiments of the invention. It should be noted that, various improvements and substitutions may also be made by one of ordinary skills in the art without departing from the technical principles of the invention, and all these improvements and substitutions should be regarded as falling into the protection scope of the invention.

What is claimed is:

1. A sealant composition, comprising:
    an epoxy resin composed of an epoxy resin having a polymerizable group and an epoxy resin having no polymerizable groups;
    10-20 mass % of α-cyanoacrylate;
    5-10 mass % of a thermal curing agent;
    15-20 mass % of a filler;
    2-5 mass % of a coupling agent; and
    0.5-1 mass % of an initiator wrapped with an inert sheathing material,
    wherein the sealant composition includes 20-30 mass % of the epoxy resin having the polymerizable group and 20-30 mass % of the epoxy resin having no polymerizable groups.

2. The sealant composition according to claim 1, wherein the initiator wrapped with the inert sheathing is an initiator microsphere particle that includes the initiator as a core material wrapped with a brittle resin material.

3. The sealant composition according to claim 2, wherein the initiator microsphere particle is formed by self-organization, in situ polymerization, co-mixing deposition, or a solvent-thermal or hydrothermal method;
    the brittle resin is one selected from the group consisting of polystyrene, acrylic resin, phenolic resin, and polyester resin; and
    the initiator is an anionic initiator.

4. The sealant composition according to claim 3, wherein, the anionic initiator is one or more selected from weak base, ROR, $NR_3$, pyridine and water in which the R in the ROR and the R in $NR_3$ are each an alkyl group.

5. The sealant composition according to claim 3, wherein, a diameter of the initiator microsphere particle is 4-10 μm.

6. The sealant composition according to claim 1, wherein, the structural formula of α-cyanoacrylate is as follows:

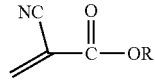

wherein, R is chain alkane or arene.

7. The sealant composition according to claim 1, wherein, the structural formula of the epoxy resin having the polymerizable group is as follows:

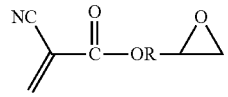

wherein, R is chain alkane or arene.

8. The sealant composition according to claim 1, wherein, the epoxy resin having no polymerizable groups is an epoxy resin having neither a highly active carbon-carbon double bond nor a highly active carbon-carbon triple bond that can be initiated to polymerize by a weak base.

9. The sealant composition according to claim 1, wherein, the coupling agent is one selected from aminosilane coupling agent, vinylsilane coupling agent and epoxysilane coupling agent.

10. The sealant composition according to claim 1, wherein, the filler is at least one selected from silicon dioxide microsphere and elastomer microsphere.

11. A method for curing the sealant composition of claim 1, comprising: applying a pressure to the sealant composition to release the initiator via a cell alignment process; and, heating at 110-130° C. for 1-2 h to cure the sealant composition.

12. A method for sealing a display device, comprising: sealing a substrate of the display device by employing the sealant composition of claim 1; releasing the initiator by pressure during the cell alignment process; and heating at 110-130° C. for 1-2 h to cure the sealant composition.

13. A display device, which employs the sealant composition of claim 1 as a peripheral sealant of a substrate of the display device.

* * * * *